US010494104B2

(12) United States Patent
Jaeger et al.

(10) Patent No.: US 10,494,104 B2
(45) Date of Patent: Dec. 3, 2019

(54) AIRCRAFT SEAT DEVICE

(71) Applicant: RECARO Aircraft Seating GmbH & Co. KG, Schwaebisch Hall (DE)

(72) Inventors: Gunther Jaeger, Sulzbach-Laufen (DE); Marsel Mejuhas, Schwaebisch Hall (DE); Martin Roderwald, Fort Worth, TX (US); Christoph Hennrich, Schwaebisch Hall (DE); Thomas Drenzeck, Michelfeld (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 16/076,018

(22) PCT Filed: Feb. 16, 2017

(86) PCT No.: PCT/EP2017/053516
§ 371 (c)(1),
(2) Date: Aug. 7, 2018

(87) PCT Pub. No.: WO2017/140791
PCT Pub. Date: Aug. 24, 2017

(65) Prior Publication Data
US 2019/0152608 A1    May 23, 2019

(30) Foreign Application Priority Data

Feb. 16, 2016   (DE) .................. 10 2016 102 707

(51) Int. Cl.
*B64D 11/06*   (2006.01)
*B60N 2/68*   (2006.01)

(52) U.S. Cl.
CPC ............ *B64D 11/0696* (2013.01); *B60N 2/68* (2013.01); *B64D 11/0648* (2014.12); *B64D 11/0649* (2014.12)

(58) Field of Classification Search
CPC ....................... B60N 2/68; B64D 11/0648
See application file for complete search history.

(56) References Cited

U.S. PATENT DOCUMENTS 3,785,600 A * 1/1974 Padovano .............. B64D 11/06
                                                          248/188.1
5,069,505 A * 12/1991 Amthor .................. B64D 11/06
                                                          297/216.2
(Continued)

FOREIGN PATENT DOCUMENTS

DE    195 23 014 A1   11/1995
DE    87 18 127 U1    2/1996
(Continued)

OTHER PUBLICATIONS

Search Report dated Nov. 10, 2016 issued in corresponding DE patent application No. 10 2016 102 707.3 (and partial English translation).
(Continued)

*Primary Examiner* — Timothy J Brindley
(74) *Attorney, Agent, or Firm* — Posz Law Group, PLC

(57) ABSTRACT

An aircraft seat device with at least one support beam, which is configured to realize at least part of a mounting unit of an aircraft seat. In at least one partial region, viewed in a circumferential direction of the support beam, the at least one support beam has a changing wall thickness.

9 Claims, 6 Drawing Sheets

(56) References Cited

U.S. PATENT DOCUMENTS

Figure 1:
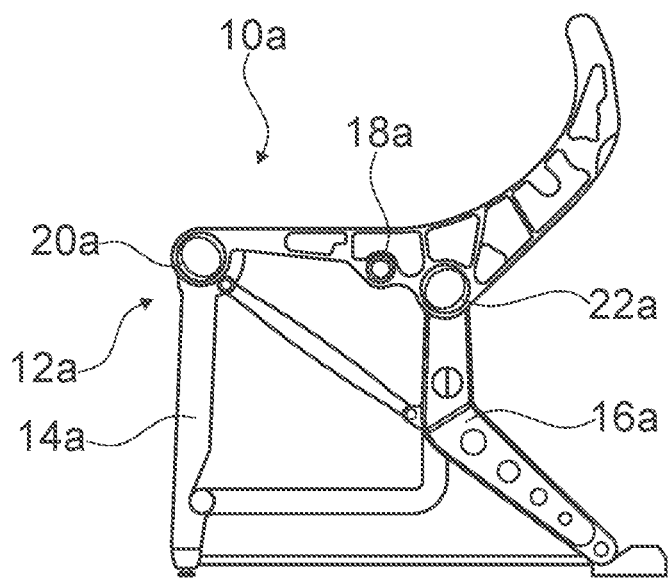

| | | | | |
|---|---|---|---|---|
| 5,567,017 A | * | 10/1996 | Bourgeois | A47C 7/40 297/228.13 |
| 5,575,532 A | * | 11/1996 | von Rolbicki | B60N 2/68 297/232 |
| 5,735,572 A | * | 4/1998 | Clark | B60N 2/68 280/730.2 |
| 5,988,756 A | * | 11/1999 | Aufrere | B60N 2/68 297/391 |
| 6,347,836 B1 | * | 2/2002 | Hayotte | B60N 2/20 297/378.1 |
| 6,352,311 B1 | * | 3/2002 | Hayotte | B60N 2/682 29/421.1 |
| 6,505,890 B2 | | 1/2003 | Riley | B60R 21/207 280/728.1 |
| 6,615,476 B1 | * | 9/2003 | Yamanaka | B21D 39/00 29/505 |
| 6,802,568 B1 | * | 10/2004 | Johnson | B64D 11/0696 297/452.13 |
| 7,107,682 B2 | * | 9/2006 | Hauger | B21C 37/08 29/412 |
| 7,412,866 B2 | * | 8/2008 | Jahani | B21C 25/08 301/124.1 |
| 7,562,937 B2 | | 7/2009 | Baumann | B60N 2/242 297/452.18 |
| 8,506,015 B2 | * | 8/2013 | Le | B60N 2/68 297/452.18 |
| 8,919,166 B2 | * | 12/2014 | Szuba | B21D 17/04 72/118 |
| 9,150,128 B2 | * | 10/2015 | Morimoto | B60N 2/68 |
| 9,764,844 B2 | * | 9/2017 | Le | B64D 11/0639 |
| 2003/0020306 A1 | * | 1/2003 | Eckendorff | B60N 2/22 297/216.1 |
| 2004/0004382 A1 | * | 1/2004 | Dowty | B64D 11/06 297/354.1 |
| 2004/0168395 A1 | * | 9/2004 | Sanftleben | E04G 15/061 52/698 |
| 2006/0201227 A1 | * | 9/2006 | Lepre | B21C 1/24 72/370.14 |
| 2007/0228794 A1 | * | 10/2007 | Penley | B60N 2/2236 297/354.1 |
| 2008/0290242 A1 | | 11/2008 | Kismarton et al. | |
| 2009/0001751 A1 | * | 1/2009 | Doxey | B60N 2/224 296/65.16 |
| 2009/0230752 A1 | * | 9/2009 | Adragna | B60N 2/1615 297/463.1 |
| 2011/0133538 A1 | * | 6/2011 | Adragna | B60N 2/1615 297/452.18 |
| 2011/0260003 A1 | | 10/2011 | Guering et al. | |
| 2012/0261963 A1 | * | 10/2012 | Heyer | B60N 2/0232 297/313 |
| 2015/0352982 A1 | * | 12/2015 | Watanabe | B60N 2/68 297/354.12 |
| 2017/0096226 A1 | * | 4/2017 | Mansouri | B64D 11/06 |

FOREIGN PATENT DOCUMENTS

| | | |
|---|---|---|
| DE | 10 2005 008 896 A1 | 8/2006 |
| DE | 10 2009 014 752 A1 | 9/2010 |
| DE | 10 2012 020 032 A1 | 4/2014 |
| EP | 1 086 759 A1 | 3/2001 |
| JP | H08-089358 A | 4/1996 |
| WO | 2005/110157 A1 | 11/2005 |
| WO | 2010/117920 A1 | 10/2010 |
| WO | 2015/055551 A1 | 4/2015 |

OTHER PUBLICATIONS

International Search Report of the International Searching Authority dated Jun. 9, 2017 issued in corresponding International Patent Application No. PCT/EP2017/053516.

International Preliminary Report on Patentability dated Apr. 19, 2018 issued in corresponding International Patent Application No. PCT/EP2017/053516 (and English translation).

Office Action dated Apr. 22, 2019 issued in corresponding CN patent application No. 201780024007.9 (and English Summary).

* cited by examiner

AIRCRAFT SEAT DEVICE

CROSS REFERENCE TO RELATED APPLICATIONS

This application is a U.S. national stage application of PCT/EP2017/053516 filed on Feb. 16, 2017, which is based on German Patent Application No. 10 2016 102 707.3 filed on Feb. 16, 2016, the contents of which are incorporated herein by reference.

BACKGROUND

The invention concerns an aircraft seat device according to the preamble of patent claim 1.

An aircraft seat device with at least one support beam, which is configured to realize at least part of a mounting unit of an aircraft seat, has already been proposed.

From WO 2010/117920 A1 an aircraft seat device with at least one support beam is already known, which is configured to implement at least a portion of an aircraft seat, wherein the at least one support beam is embodied as a simple hollow profile and has, in at least one partial region, viewed in a circumferential direction of the support beam, a changing wall thickness and an at least substantially circular outer contour.

From US 2008/290242 A1 an aircraft seat device with at least one support beam is known, which is configured to implement at least a portion of an aircraft seat, wherein the support beam, viewed in a circumferential direction of the support beam, has a changing wall thickness.

From DE 10 2012 020032 A1 an aircraft seat device with at least one support beam is known, which is configured to implement at least a portion of an aircraft seat, wherein the support beam, viewed in a circumferential direction of the support beam, has a changing wall thickness.

From US 2011/260003 A1 an aircraft seat device with at least one support beam is known, which is configured to implement at least a portion of an aircraft seat.

The objective of the invention is in particular to provide a generic device having improved characteristics in regard to an especially light-weight and/or stable aircraft seat device. The objective is achieved according to the invention by the features of patent claim 1, while advantageous implementations and further developments of the invention may be gathered from the subclaims.

SUMMARY

The invention is based on an aircraft seat device with at least one support beam, which is configured to realize at least part of a mounting unit of an aircraft seat, wherein the at least one support beam is embodied as a simple hollow profile and wherein, in at least one partial region, viewed in a circumferential direction of the support beam, the at least one support beam has a changing wall thickness and an at least substantially circular outer contour.

It is proposed that the outer contour of the support beam differs in its basic shape at least in partial regions from a basic shape of an inner contour. An "aircraft seat device" is herein in particular to mean a device implementing at least a portion or a complete aircraft seat, a portion of an aircraft seat row or an entire aircraft seat row. By an "aircraft seat" is herein in particular a seat to be understood which is configured to be mounted in an aircraft cabin. The aircraft seat herein preferably comprises at least one mounting unit, via which it is mounted on the cabin floor, a seat bottom that is coupled with the mounting unit and is configured to realize a sitting surface for a passenger, a backrest that is coupled with the seat bottom and with the mounting unit and is configured to provide a backrest surface for a passenger, and at least one armrest. By a "mounting unit" is herein in particular a unit of an aircraft seat to be understood by means of which the aircraft seat is mounted, in particular via at least two fixation rails, on a cabin floor of the aircraft cabin and which for this purpose preferentially comprises a plurality of seat feet and at least one support beam that is coupled with the seat feet. By a "support beam" is herein in particular a part of the mounting unit to be understood that extends transversely to the seat direction of the seats which are mounted via the mounting unit. The support beam is herein in particular configured to transfer loads into the seat feet of the mounting unit and/or to receive torques. "At least one partial region" is herein in particular to mean a region of the support beam along a longitudinal extension. "Configured" is in particular to mean specifically designed and/or equipped. By an object being configured for a certain function is in particular to be understood that the object fulfills and/or implements said certain function in at least one application state and/or operation state. By a "changing wall thickness" is herein in particular to be understood that a thickness of the wall, measured from an inner side to an outer side, changes at least once in the course of the wall along the circumferential direction. By an implementation according to the invention it is advantageously possible to provide a support beam having particularly advantageous properties regarding a strength as well as a section modulus, advantageously a directed section modulus. This allows implementing a seat device in an especially lightweight fashion as the at least one support beam may be designed particularly advantageously corresponding to a load.

It is particularly advantageous if the at least one support beam is embodied as a simple hollow profile. A "simple hollow profile" is herein in particular to mean a profile at least substantially encompassing an interior space at least in one plane, wherein the profile has one single wall encompassing the interior space. It is herein conceivable that the single wall is implemented of a plurality of individual segments embodying, in a mounted/connected state, a common contiguous wall. A simple hollow profile in particular neither has interior regions within the interior space which are separate from one another nor has it such regions implemented by walls which are at least partially spaced apart from one another. As a result, the support beam may be implemented in a particularly lightweight and simple fashion.

Moreover it is proposed that the support beam comprises at least one one-piece element featuring, viewed in a circumferential direction of the support beam, a changing wall thickness. By a "one-piece element" is herein in particular an element to be understood which is embodied of a contiguous piece of material. Principally it is also conceivable that the one-piece element comprises a plurality of elements which are connected by substance-to-substance bond as a result of a connection process, e.g. via adhesive-bonding and/or welding. Advantageously the support beam embodied as a one-piece element is produced in an extrusion process in a one-piece implementation. This allows realizing the support beam in a particularly advantageous fashion.

It is particularly advantageous if the support beam has an at least substantially circular outer contour. By an "at least substantially circular outer contour" is herein in particular to be understood that the outer contour differs from a circle contour by maximally 10%. preferably by maximally 5% and in an advantageous implementation by less than 1%. In particular, the support beam herein has a constant outer contour. Advantageously the outer contour is realized by a circle contour. This allows realizing the support beam in an especially advantageous fashion.

By the outer contour of the support beam differing in its basic shape at least in partial regions from a basic shape of an inner contour, this allows realizing the different wall thicknesses of the support beam in a particularly simple manner.

It is further proposed that the support beam has a changing wall thickness along its longitudinal extension. By a "longitudinal extension" is herein in particular a main extension direction of the support beam to be understood which is in a mounted state oriented orthogonally to a direction of a seat which the aircraft seat device is part of. This allows realizing the support beam particularly variably.

In an implementation that is not part of the invention, the support beam is implemented by at least two outer elements and at least one connection element which connects the two outer elements to each other, wherein at least the outer elements and the at least one connection element are realized of different materials. By an "outer element" is herein in particular an element to be understood which delimits the support beam outwards in at least one direction, thus at least partly implementing an outer surface of the support beam. By a "connection element" is herein in particular an element to be understood which connects the at least two outer elements to each other, thus at least partly implementing a middle region of the support beam. It is herein conceivable that a connection element is also at least partly implemented as an outer surface of the support beam. By "different materials" are herein in particular materials to be understood which in particular have at least partly differing material characteristics, e.g. differing strengths. It is herein conceivable that the differing materials are constituted by the same basic materials, are implemented just as different alloys or, in the case of fiber composite materials, composite materials with different fibers. By a "different material" is herein in particular a material to be understood which has differing material characteristics, e.g. in particular a differing rigidity, a differing strength and/or a differing density. The outer elements are herein preferably made of a more rigid material, which preferentially has a greater strength. In this way the support beam may, in portions carrying differing loads, be realized of respectively advantageous materials, as a result of which an especially lightweight support beam may be rendered available which has a rigidity and strength complying with requirements.

In an implementation that is not part of the invention, the outer elements may be made of a more rigid material than the at least one connection element. This allows realizing an especially advantageous support beam.

Furthermore, in the implementation that is not part of the invention, the outer elements may be implemented of a thermoplastic composite material. By a "thermoplastic composite material" is herein in particular a composite material to be understood which comprises a matrix implemented of a thermoplastic material and comprising fibers that are embedded in the matrix. The fibers may herein be realized, for example, as carbon fibers, glass fibers or as another kind of fibers deemed expedient by someone skilled in the art. In this way the outer elements may be implemented in a particularly lightweight fashion, thus allowing to provide an especially advantageous support beam.

In an implementation that is not part of the invention, the support beam may be embodied as a double-I-beam. This allows implementing the support beam in a particularly flexurally rigid fashion.

It is moreover proposed that the support beam has at least one symmetry axis. This allows manufacturing the support beam particularly easily and advantageously. Principally it is also conceivable that the support beam merely has a symmetry point, thus realizing a point symmetry.

It is further proposed that the support beam is at least partially implemented of a rolled sheet of metal. By a "rolled sheet of metal" is in particular, in this context, a support beam to be understood which is implemented of a metal sheet that is in a manufacturing process rolled to a tube wherein, to form the tube, the ends of the metal sheet are connected to one another by substance-to-substance bond using a suitable connection procedure, e.g. in particular by a welding procedure. In this way the different wall thicknesses of the support beam are producible in a particularly simple manner.

The aircraft seat device according to the invention is herein not to be restricted to the application and implementation described above. In particular, to fulfill a functionality described here, the aircraft seat device according to the invention may comprise a number of respective elements, structural components and units that differs from a number that is mentioned here.

DRAWINGS

Further advantages will become apparent from the following description of the drawings. In the drawings nine exemplary embodiments of the invention are shown. The drawings, the description and the claims contain a plurality of features in combination. Someone skilled in the art will purposefully also consider the features separately and will find further expedient combinations.

Figure 2:
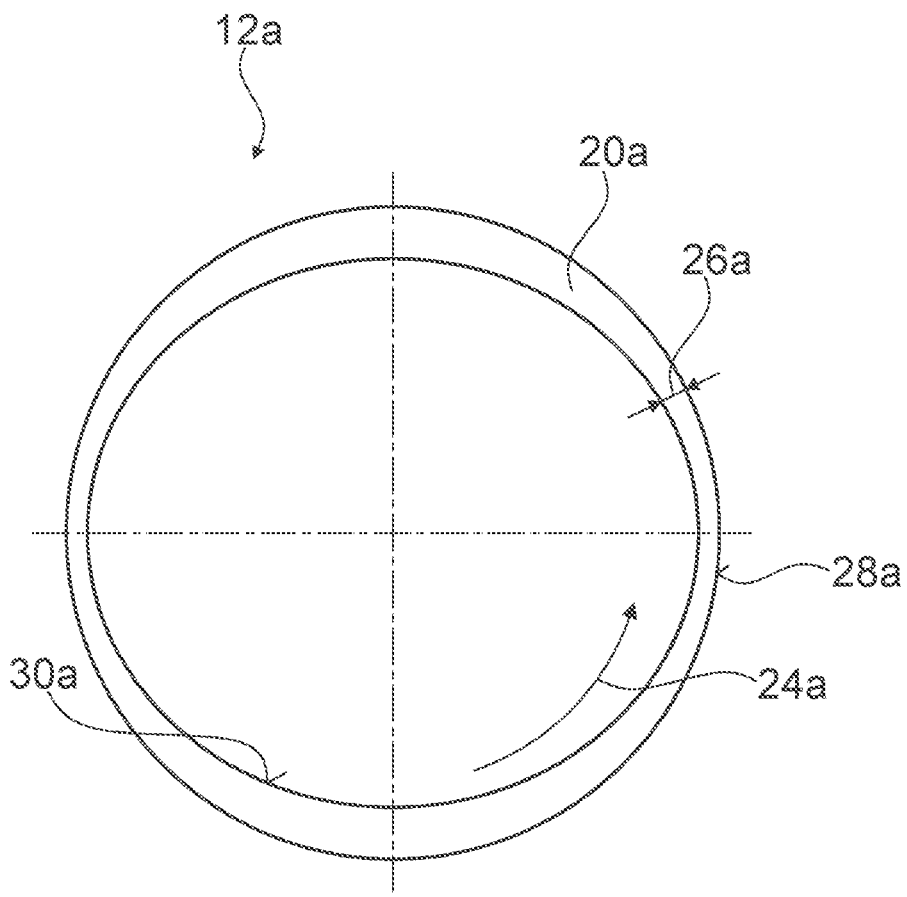
Figure 3:
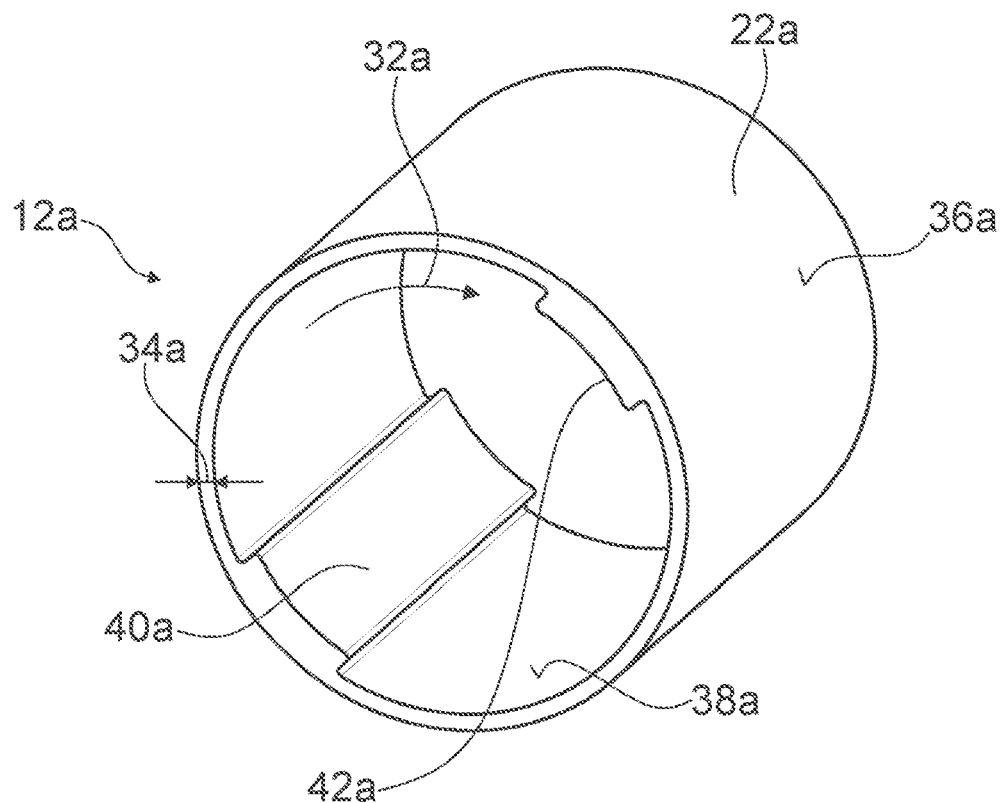
Figure 4:
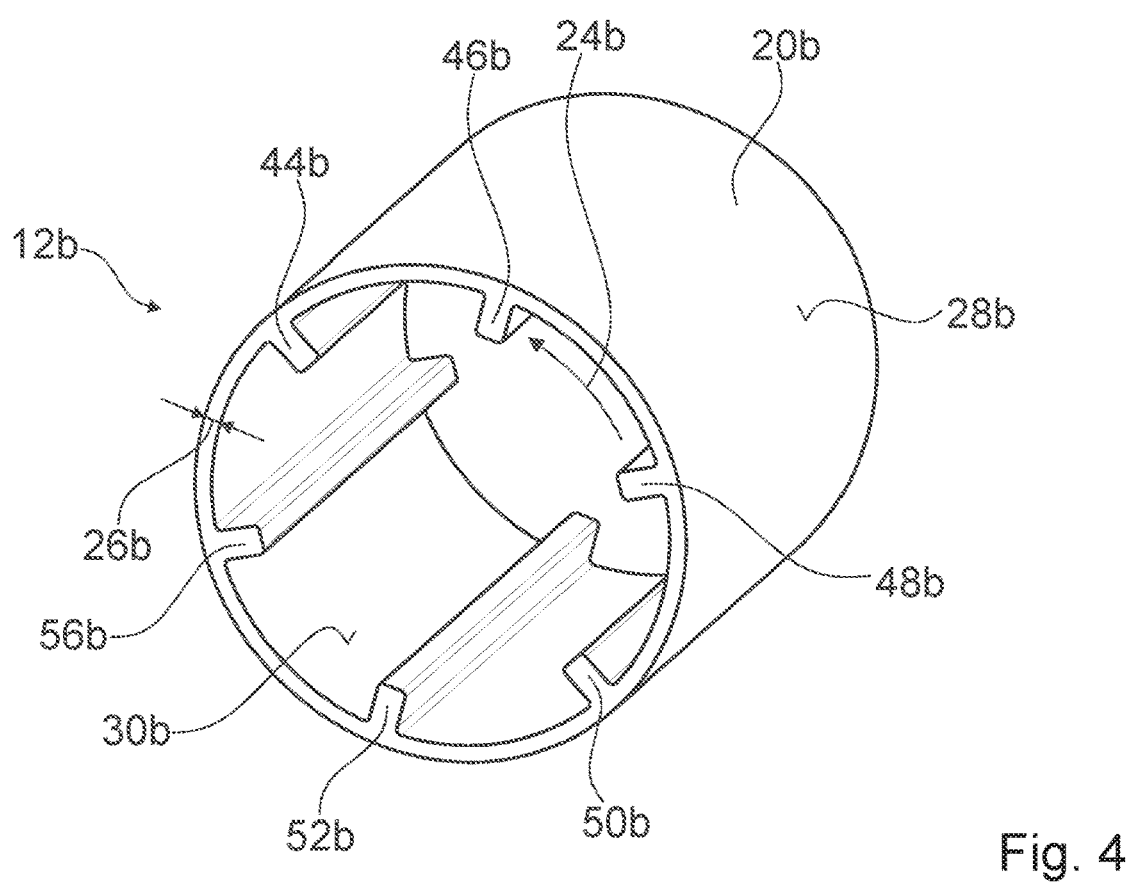
Figure 5:
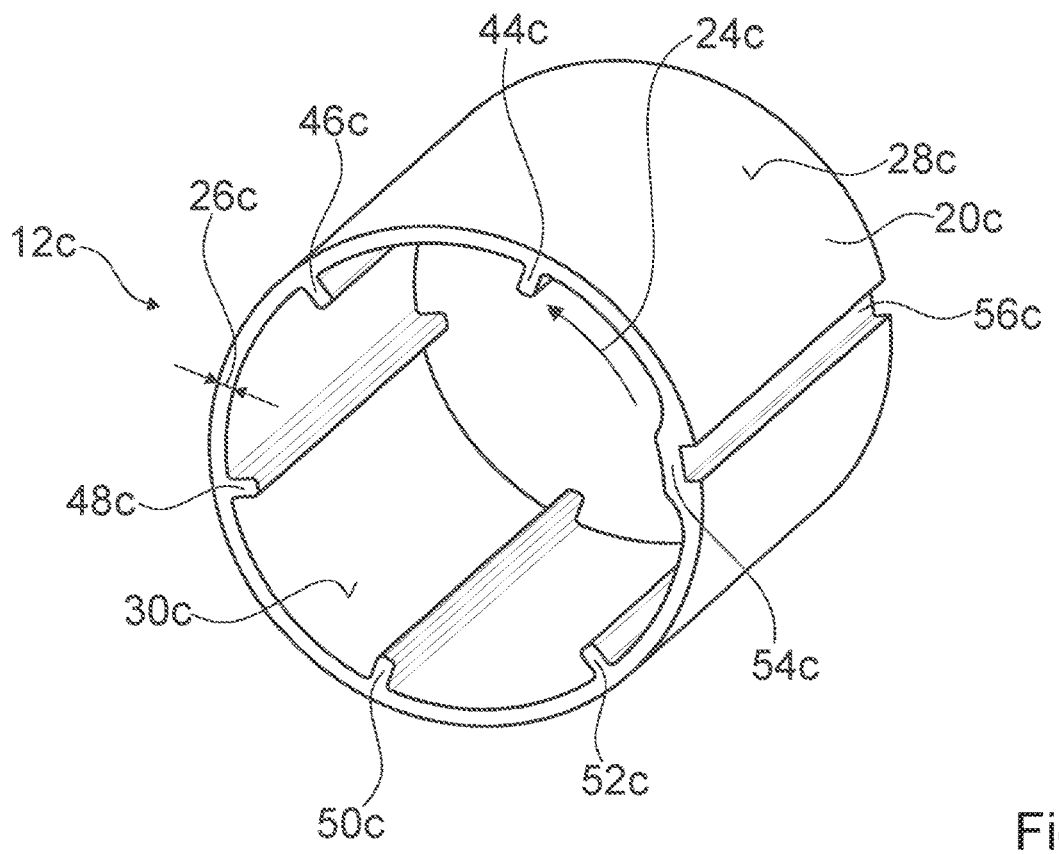
Figure 6:
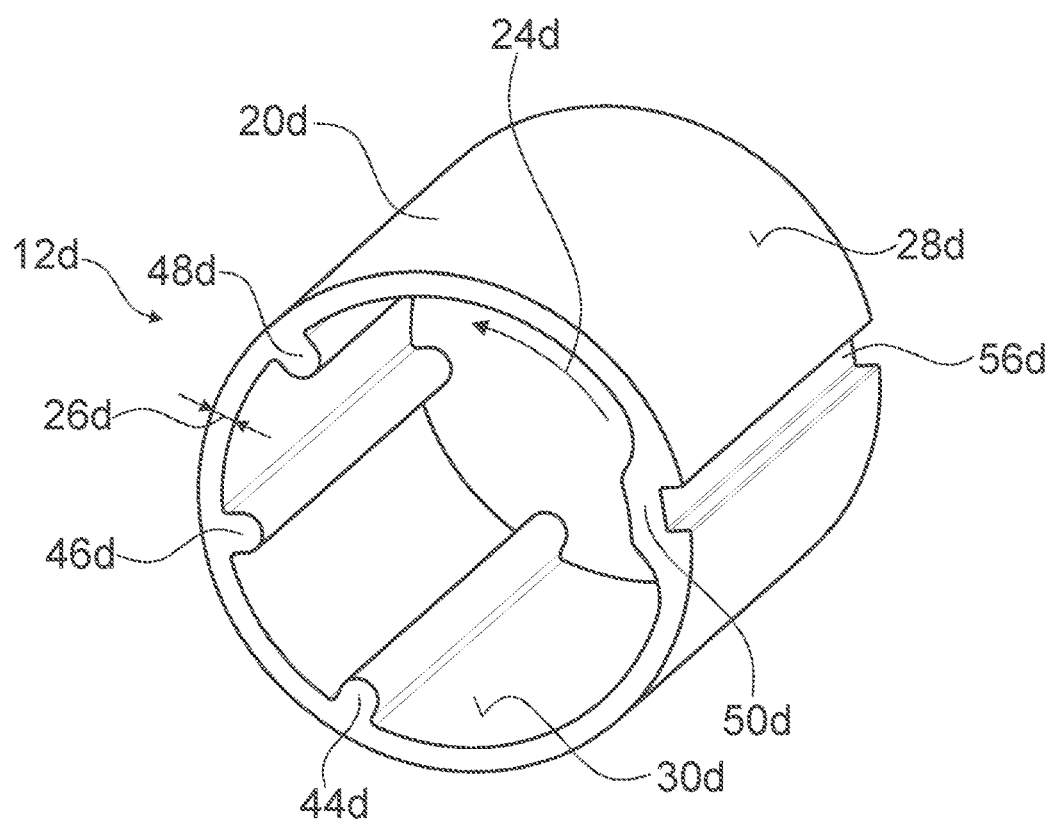
Figure 7:
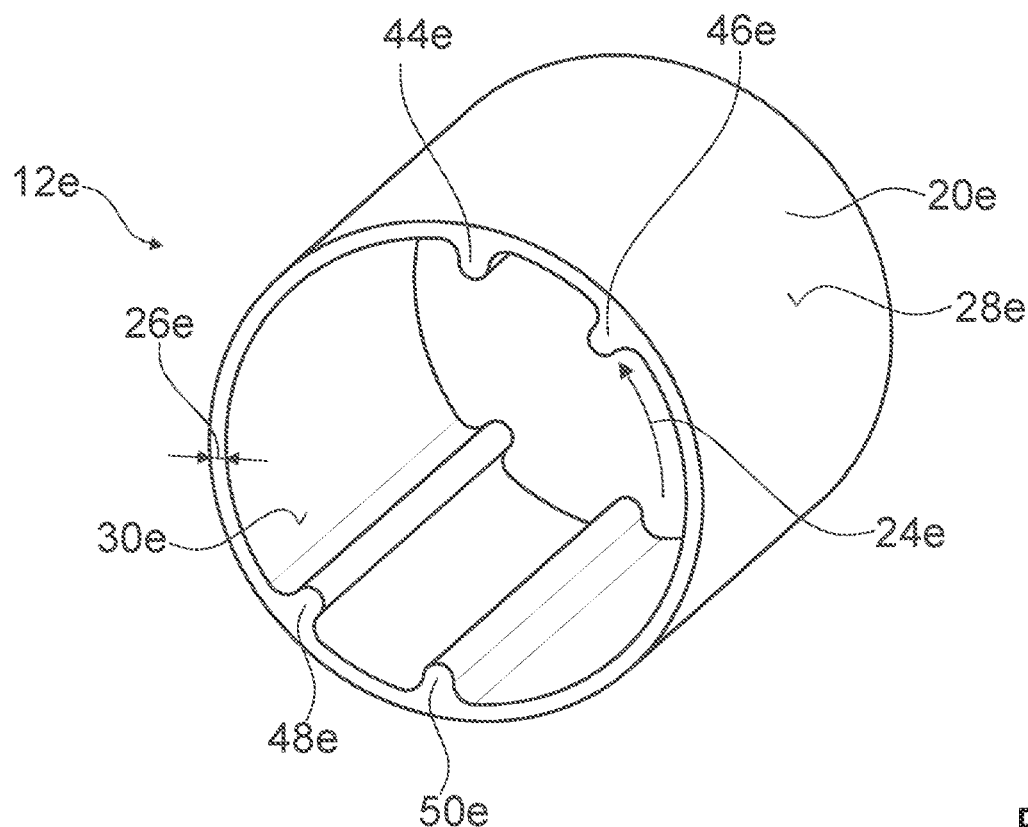
Figure 8:
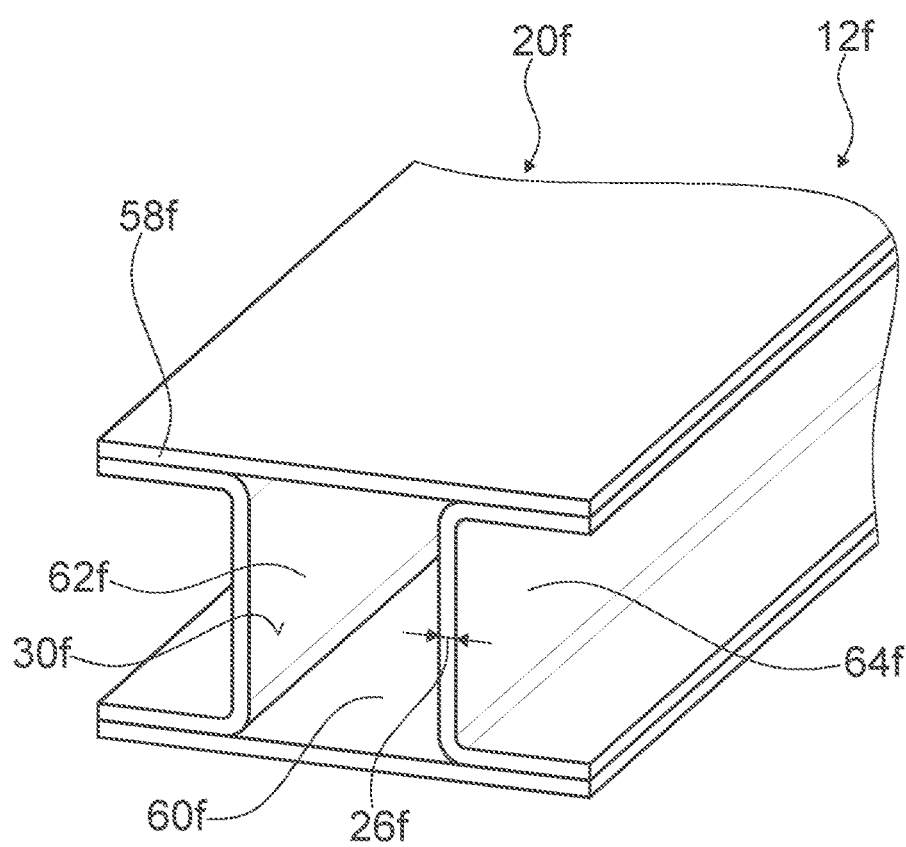
Figure 9:
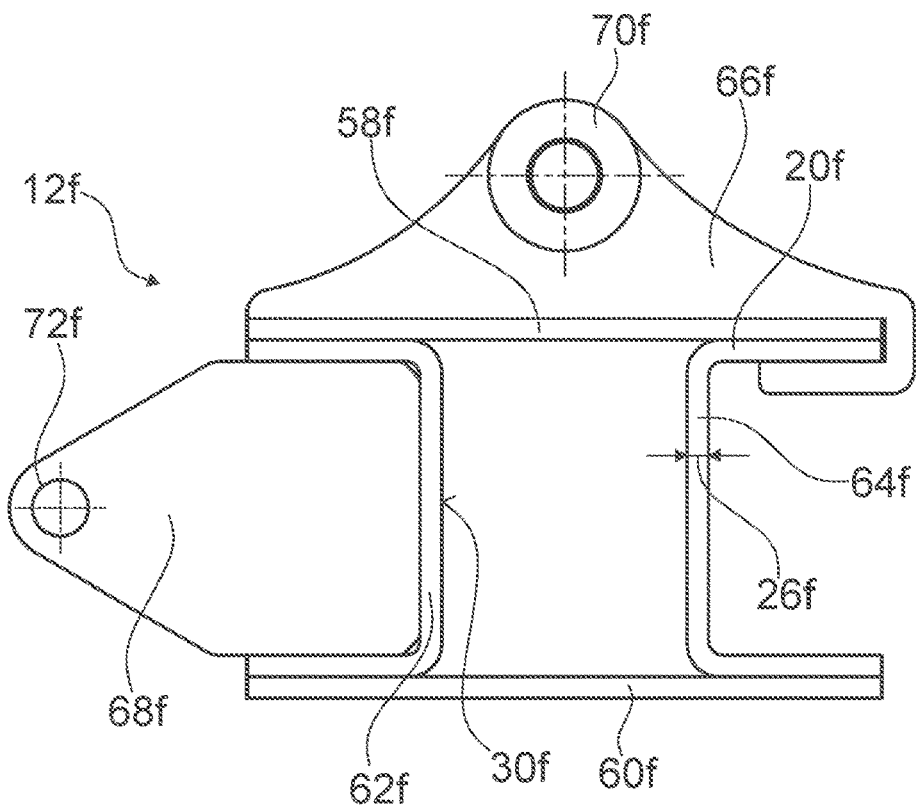
Figure 10:
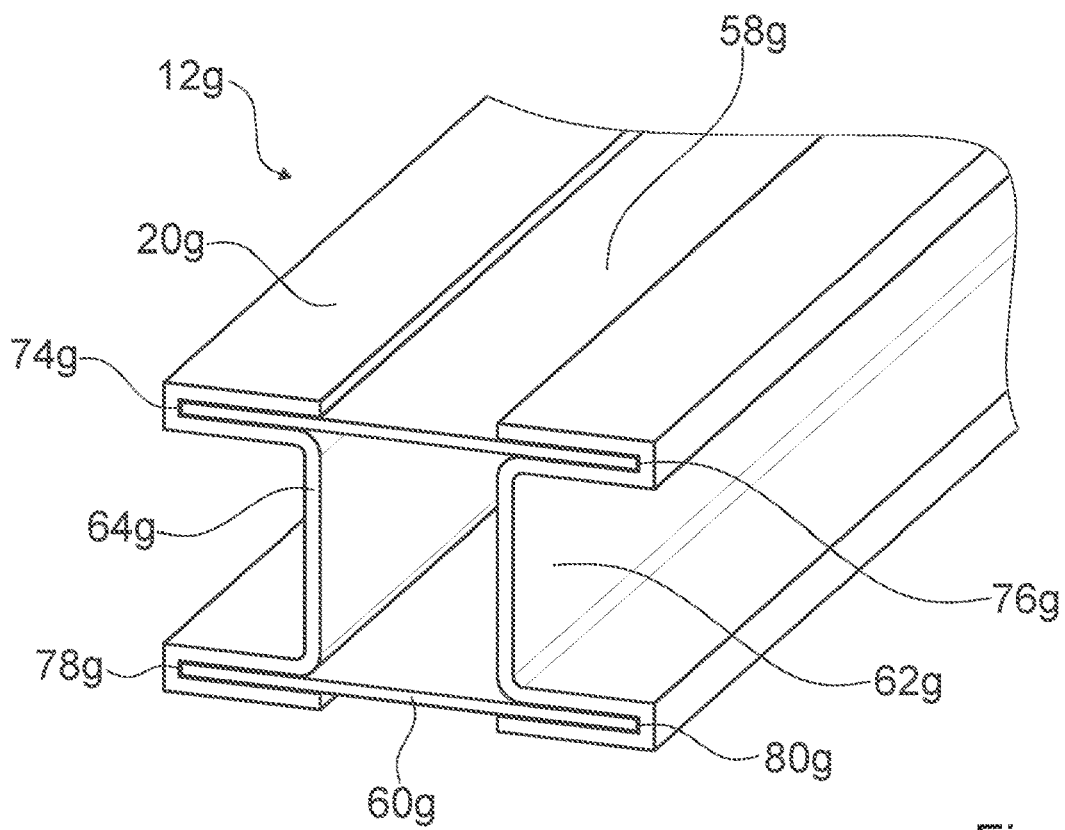
Figure 11:
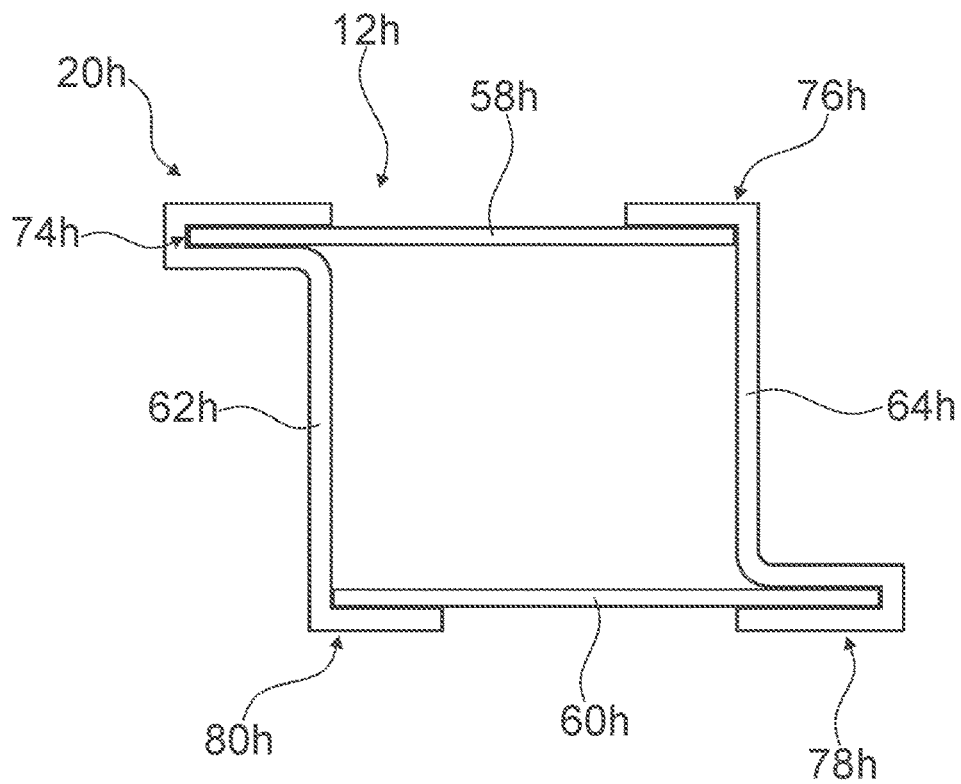
Figure 12:
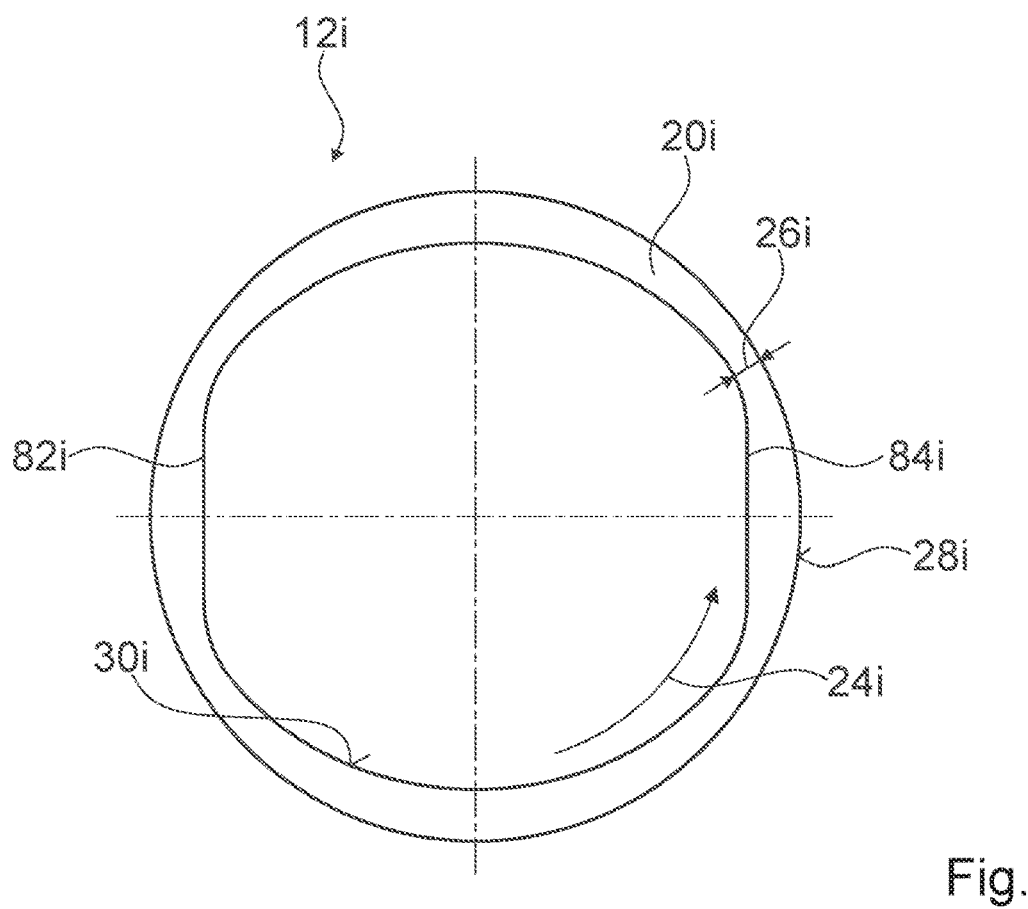

It is shown in:

FIG. 1 a schematic representation of an aircraft seat device according to the invention in a first exemplary embodiment with a partially depicted aircraft seat row, FIG. 2 a sectional view of a support beam of a mounting unit of the aircraft seat device according to the invention, FIG. 3 a sectional view of a support beam of a mounting unit of the aircraft seat device according to the invention, FIG. 4 a schematic representation of an aircraft seat device according to the invention in a second exemplary embodiment with a sectional view of a support beam, FIG. 5 a schematic representation of an aircraft seat device according to the invention in a third exemplary embodiment with a sectional view of a support beam, FIG. 6 a schematic representation of an aircraft seat device according to the invention in a fourth exemplary embodiment with a sectional view of a support beam, FIG. 7 a schematic representation of an aircraft seat device according to the invention in a fifth exemplary embodiment with a sectional view of a support beam, FIG. 8 a schematic representation of an aircraft seat device is not part of the invention, in a sixth exemplary embodiment with a sectional view of a support beam, FIG. 9 a sectional view of a support beam with linking elements of an aircraft seat device that is not part of the invention, FIG. 10 a schematic representation of an aircraft seat device according to the invention in a seventh exemplary embodiment with a sectional view of a support beam, FIG. 11 a schematic representation of an aircraft seat device that is not part of the invention, in an eighth exemplary embodiment with a sectional view of a support beam, and FIG. 12 a schematic representation of an aircraft seat device is not part of the invention, in a ninth exemplary embodiment with a sectional view of a support beam.

DESCRIPTION OF THE EXEMPLARY EMBODIMENTS

FIGS. 1 to 3 show an aircraft seat device in a first exemplary embodiment. The aircraft seat device is part of an aircraft seat 10a, which is shown only partially. The aircraft seat 10a is configured to be mounted in an aircraft cabin. Herein preferably a plurality of aircraft seats (not shown in detail) are mounted in the aircraft cabin. The aircraft seat 10a comprises a mounting unit 12a, by means of which it is mounted in the aircraft cabin. The aircraft seat 10a is herein part of an aircraft seat row. The seat row herein comprises a plurality of aircraft seats 10a. The mounting unit 12a is herein part of the aircraft seat row. The aircraft seats 10a of the seat row are herein embodied substantially identically. The aircraft seats 10a of a seat row are herein mounted on the cabin floor of the aircraft cabin via the mounting unit 12a. The mounting unit 12a comprises two front seat feet 14a and two rear seat feet 16a, via which the aircraft seat 10a is mounted on the cabin floor of the aircraft cabin. The mounting unit 12a comprises a plurality of seat dividers 18a, via which parts of the aircraft seats 10a of the seat row are connected to the mounting unit 12a.

The mounting unit 12a comprises two support beams 20a, 22a. Principally it is also conceivable that the mounting unit 12a comprises only one support beam or a different number of support beams 20a, 22a. The first support beam 20a is embodied as a front support beam 20a. The front support beam 20a is arranged on a front end of the aircraft seat 10a, in a region of the front seat feet 14a. The second support beam 22a is embodied as a rear support beam 22a. The rear support beam 22a is arranged on a rear end of the aircraft seat 10a, in a region of the rear seat feet 16a. The support beams 20a, 22a extend in a transverse direction of the aircraft seat 10a. The support beams 20a, 22a extend in the transverse direction over an entire width of the seat row. The two support beams 20a, 22a are implemented as hollow profiles. The support beams 20a, 22a are implemented as elongate tubes having a longitudinal extension that is substantially equivalent to a width of the aircraft seat row. The support beams 20a, 22a each have a ring-shaped cross section. The support beams 20a, 22a are herein embodied as one-piece elements. The support beams 20a, 22a comprise neither separate outer elements nor inner elements. The two support beams 20a, 22a are implemented differently. Principally it would however also be conceivable that the two support beams 20a, 22a are implemented identically. It would then be conceivable that the two identically implemented support beams 20a, 22a each have a differing orientation.

The support beam 20a is embodied as a simple hollow profile. The support beam 20a herein comprises only one wall, which delimits a single hollow space inside. The support beam 20a has a changing wall thickness 26a in a circumferential direction 24a of the support beam 20a. The wall thickness 26a is herein realized by a distance between an inner contour 30a and an outer contour 28a of the support beam 20a, viewed from a center point of the support beam 20a radially outwards. The support beam 20a has the same wall thickness over its entire longitudinal extension. Over its entire longitudinal extension, the support beam 20a has a wall thickness 26a changing in the circumferential direction 24a. Principally it would also be conceivable that the support beam 20a has a wall thickness changing in a circumferential direction only in partial regions, e.g. in linking regions for seat feet 14a, 16a or seat dividers 18a. It would herein also be well conceivable that a cross section of the support beam 20a is embodied differently in the different linking regions. The support beam 20a has a circle-shaped outer contour 28a. The basic shape of the outer contour 28a herein implements a circle. Due to the circle-shaped outer contour 28a, it is possible to link the seat feet 14a, 16a and the seat dividers 18a to the support beam 20a in a particularly simple and advantageous fashion. An inner contour 30a of the support beam 20a has a basic shape that differs from the basic shape of the outer contour 28a. The inner contour 30a of the support beam 20a is implemented elliptically. Due to the elliptic implementation of the inner contour 30a of the support beam 20a, the wall thickness of the support beam 20a changing in the circumferential direction 24a is easily achievable. The support beam 20a is embodied symmetrically. Due to the elliptic implementation of the inner contour 30a, the support beam 20a has a significantly smaller wall thickness in one radial direction than in a radial direction that is rotated by 90°. As a result of this, the support beam 20a has section moduli of different magnitudes in different radial directions, thus allowing designing and orienting the support beam 20a depending on a load acting on the support beam 20a, e.g. due to belt forces introduced into the support beam 20a. In this way a weight advantage is achievable.

The support beam 20a is herein embodied as a rolled metal sheet. Herein a metal sheet, as a base body, is processed in a manufacturing procedure by first of all rolling hollows into the metal sheet which will later realize the thin regions of the support beam 20a. Then the metal sheet is rolled in such a way that it is shaped into a tube. Finally the ends of the metal sheet are fixedly connected to one another in their contact points via a suitable welding process. Principally other process are also conceivable for connecting the ends of the metal sheet by substance-to-substance bond. Principally it would also be conceivable that the support beam 20a is produced in a different way deemed expedient by someone skilled in the art, e.g. by a pressure-forming process.

The rear support beam 22a is embodied as a simple hollow profile. The support beam 22a herein has only one wall delimiting a single hollow space inside. The support beam 22a has a changing wall thickness 34a in a circumferential direction 32a of the support beam 22a. The wall thickness 34a is herein realized dby a distance between an inner contour 30a and an outer contour 28a of the support beam 22a, viewed from a center point of the support beam 22a radially outwards. The support beam 22a has a circle-shaped outer contour 36a. The basic shape of the outer contour 36a herein forms a circle. An inner contour 38a of the support beam 22a substantially implements a circle shape. The inner contour 38a of the support beam 22a comprises elevations 40a, 42a. The elevations 40a, 42a rise from the circle-shaped region of the inner contour 38a inwards. Herein the elevations 40a, 42a extend inwards approximately by the wall thickness of the support beam 22a. The elevations 40a, 42a are herein arranged on opposite-situated sides of the inner contour 38a. The elevations 40a, 42a are herein implemented identically. The elevations 40a, 42a have a plateau. In the region of their plateau, the elevations 40a, 42a have a partial-circle-shape. The elevations 40a, 42a herein have a length of 10 mm in the circumferential direction 32a. Principally it is also conceivable that the elevations 40a, 42a have, in the circumferential direction 32a, a length that is in a range from 5 mm to 30 mm. The support beam 22a is herein embodied symmetrically. The support beam 22a additionally has a wall thickness 34a that is variable in a longitudinal extension of the support beam 22a. The elevations 40a, 42a are herein interrupted in partial regions of the longitudinal extension of the support beam 22a, resulting in the wall thickness 34a that is variable in the longitudinal extension.

In FIGS. 4 to 12 eight further exemplary embodiments of the invention are shown. The following descriptions and the drawings are substantially limited to the differences between the exemplary embodiments, wherein regarding identically designated structural components, in particular regarding structural components having the same reference numerals, the drawings and/or descriptions of the other exemplary embodiments, in particular of FIGS. 1 to 3, may principally also be referred to. To distinguish between the exemplary embodiments, the letter a has been added to the reference numerals of the exemplary embodiment in FIGS. 1 to 3. In the exemplary embodiments of FIGS. 4 to 12 the letter a has been substituted by the letters b to i.

FIG. 4 shows an aircraft seat device in a second exemplary embodiment. The aircraft seat device is part of an aircraft seat, which is not shown in detail. The aircraft seat comprises a mounting unit 12b, via which it is mounted in the aircraft cabin. The mounting unit 12b comprises a support beam 20b and a support beam that is not shown. As a difference from the first exemplary embodiment, merely the cross section of the support beam 20b and of the support beam that is not shown differs from the corresponding support beams of the first exemplary embodiment. The support beam 20b and the support beam that is not shown are embodied identically, which is why only the support beam 20b will be described in detail in the following. For an explanation of the support beam that is not shown, the following description of the support beam 20b may be applied.

The support beam 20b is embodied as a simple hollow profile. The support beam 20b herein comprises only one wall, which delimits a single hollow space inside. The support beam 20b has a changing wall thickness 26b in a circumferential direction 24b of the support beam 20b. The wall thickness 26b is herein realized by a distance between an inner contour 30b and an outer contour 28b of the support beam 20b, viewed from a center point of the support beam 20b radially outwards. The support beam 20b has a circle-shaped outer contour 28b. The basic shape of the outer contour 28b herein forms a circle. An inner contour 30b of the support beam 20b substantially forms a circle shape. The inner contour 30b of the support beam 20b comprises six elevations 44b, 46b, 48b, 50b, 52b, 54b. The elevations 44b, 46b, 48b, 50b, 52b, 54b are implemented as webs. The elevations 44b, 46b, 48b, 50b, 52b, 54b are distributed equally in the circumferential direction 24b of the support beam 20b. Principally it is also conceivable that the inner contour 30b comprises a different number of elevations 44b, 46b, 48b, 50b, 52b, 54b. The elevations 44b, 46b, 48b, 50b, 52b, 54b extend from the circle-shaped portion of the inner contour 30b inwards. The elevations 44b, 46b, 48b, 50b, 52b, 54b herein have a height relative to the circle-shaped portion of the inner contour 30b, which is equivalent to twice the minimum wall thickness 26b. Principally it is also conceivable that the elevations 44b, 46b, 48b, 50b, 52b, 54b have a different height that is deemed expedient by someone skilled in the art. Principally it is also conceivable that the elevations 44b, 46b, 48b, 50b, 52b, 54b have different heights.

FIG. 5 shows an aircraft seat device in a third exemplary embodiment. The aircraft seat device is part of an aircraft seat, which is not shown in detail. The aircraft seat comprises a mounting unit 12c, via which it is mounted in the aircraft cabin. The mounting unit 12c comprises a support beam 20c and a support beam that is not shown. Differently from the first exemplary embodiment, merely the cross section of the support beam 20c and of the support beam that is not shown differs from the corresponding support beams of the first exemplary embodiment. The support beam 20c and the support beam that is not shown are implemented identically, and therefore only the support beam 20c will be described in detail in the following. For an explanation of the support beam that is not shown, the following description of the support beam 20c may be used.

The support beam 20c is embodied as a simple hollow profile. The support beam 20c herein comprises only one wall delimiting a single hollow space inside. The support beam 20c has a changing wall thickness 26c in a circumferential direction 24c of the support beam 20c. The wall thickness 26c is herein realized by a distance between an inner contour 30c and an outer contour 28c of the support beam 20c, viewed from a center point of the support beam 20c radially outwards. The support beam 20c has a circle-shaped outer contour 28c. The basic shape of the outer contour 28c herein forms a circle. An inner contour 30c of the support beam 20c substantially realizes a circle shape. The inner contour 30c of the support beam 20c comprises six elevations 44c, 46c, 48c, 50c, 52c, 54c. Herein five of the elevations 44c, 46c, 48c, 50c, 52c are implemented identically. The elevations 44c, 46c, 48c, 50c, 52c are implemented in the same way as the corresponding elevations of the second exemplary embodiment of FIG. 4. The sixth elevation 54c has substantially the same height as the other elevations 44c, 46c, 48c, 50c, 52c. The elevation 54c features a plateau. The elevation 54c features an extension in the circumferential direction 24c that is larger than the elevations 44c, 46c, 48c, 50c, 52c.

The support beam 20c comprises a deepening 56c on its outer contour 28c. The deepening 56c is arranged in a region of the largest elevation 54c of the inner contour 30c. The deepening 56c herein extends in a longitudinal extension of the support beam 20c in parallel to the elevation 54c of the inner contour 30c. The deepening 56c herein extends over an entire longitudinal extension of the support beam 20c. Principally it would also be conceivable that, at least in partial regions of the longitudinal extension, the deepening 56c or individual ones of the elevations 44c, 46c, 48c, 50c, 52c, 54c do not exist.

FIG. 6 shows an aircraft seat device in a fourth exemplary embodiment. The aircraft seat device is part of an aircraft seat that is not shown in detail. The aircraft seat comprises a mounting unit 12d, via which it is mounted in the aircraft cabin. The mounting unit 12d comprises a support beam 20d and a support beam that is not shown. As a difference from the first exemplary embodiment, merely the cross section of the support beam 20d and of the support beam that is not shown differs from the corresponding support beams of the first exemplary embodiment. The support beam 20d and the support beam that is not shown are implemented identically, and thus only the support beam 20d will be described in detail in the following. For an explanation of the support beam that is not shown, the following description of the support beam 20d may be used.

The support beam 20d is implemented as a simple hollow profile. The support beam 20d herein comprises only one wall, which delimits a single hollow space inside. The support beam 20d has a changing wall thickness 26d in a circumferential direction 24d of the support beam 20d. The wall thickness 26d is herein realized by a distance between an inner contour 30d and an outer contour 28d of the support beam 20d, viewed from a center point of the support beam 20d radially outward. The support beam 20d has a substantially circle-shaped outer contour 28d. An inner contour 30d of the support beam 20d substantially forms a circle shape. The inner contour 30d of the support beam 20d comprises four elevations 44d, 46d, 48d, 50d. Herein three of the elevations 44d, 46d, 48d are embodied identically. Herein two outer elevations 44d, 48d are arranged equally distanced from the middle elevation 46d. The elevations 44d, 46d, 48d herein have a height that substantially corresponds to a wall thickness of the support beam 20d in a point in which the inner contour 30d implements a circle shape. The elevations 44d, 46d, 48d each have a rounded end. An elevation 50d is arranged on the inner contour 30d on a side opposite the middle elevation 46d. The elevation 50d has a height that is substantially equivalent to a wall thickness of the support beam 20d in a point in which the inner contour 30d implements a circle shape. The elevation 50d forms a plateau. The elevation 50d herein extends in the circumferential direction 24d of the support beam 20d approximately by twice the wall thickness 26d of the support beam 20d in a region in which the inner contour 30d implements a circle shape. Principally it is also conceivable that the elevation 50d has a different-sized extension. The support beam 20d comprises a deepening 56d on its outer contour 28d. The deepening 56d is arranged in a region of a largest elevation 50d of the inner contour 30d. The deepening 56d herein extends in a longitudinal extension of the support beam 20d in parallel to the elevation 50d of the inner contour 30d. The deepening 56d herein extends over an entire longitudinal extension of the support beam 20d. Principally it would also be conceivable that, at least in partial regions of the longitudinal extension, the deepening 56d or individual ones of the elevations 44d, 46d, 48d, 50d do not exist.

FIG. 7 shows an aircraft seat device in an exemplary embodiment that is not part of the invention. The aircraft seat device is part of an aircraft seat, which is not shown in detail. The aircraft seat comprises a mounting unit 12e, via which it is mounted in the aircraft cabin. The mounting unit 12e comprises a support beam 20e and a support beam that is not shown. As a difference from the first exemplary embodiment, merely the cross section of the support beam 20e and of the support beam that is not shown differs from the corresponding support beams of the first exemplary embodiment. The support beam 20e and the support beam that is not shown are implemented identically, and thus only the support beam 20e will be described in detail in the following. For an explanation of the support beam that is not shown, the following description of the support beam 20e may be used.

The support beam 20e is implemented as a simple hollow profile. The support beam 20e herein comprises only one wall, which delimits a single hollow space inside. The support beam 20e has a changing wall thickness 26e in a circumferential direction 24e of the support beam 20e. The wall thickness 26e is herein realized by a distance between an inner contour 30e and an outer contour 28e of the support beam 20e, viewed from a center point of the support beam 20e radially outward. The support beam 20e has a substantially circle-shaped outer contour 28e. An inner contour 30e of the support beam 20e substantially forms a circle shape. The inner contour 30e of the support beam 20e comprises four elevations 44e, 46e, 48e, 50e. The four elevations 44e, 46e, 48e, 50e are herein embodied identically. The two elevations 44e, 46e and the two elevations 48e, 50e are respectively arranged in pairs. Herein the elevations 44e, 46e and the elevations 48e, 50e are arranged mirror-symmetrically to a central plane of the support beam 20e. The elevation 44e and the elevation 46e have a same distance from each other as the elevation 48e and the elevation 50. The elevations 44e, 46e, 48e, 50e each have a rounded end.

FIGS. 8 and 9 show an aircraft seat device in an exemplary embodiment that is not part of the invention. The aircraft seat device is part of an aircraft seat, which is not shown in detail. The aircraft seat comprises a mounting unit 12f, via which it is mounted in the aircraft cabin. The mounting unit 12f comprises a support beam 20f and a support beam that is not shown. As a difference from the first exemplary embodiment, merely the cross section of the support beam 20f and of the support beam that is not shown differs from the corresponding support beams of the first exemplary embodiment. The support beam 20f and the support beam that is not shown are implemented identically, and thus only the support beam 20f will be described in detail in the following. For an explanation of the support beam that is not shown, the following description of the support beam 20f may be used. Principally it is also conceivable that the support beam 20f is embodied as a single support beam and the mounting unit 12f comprises only the one support beam 20f.

The support beam 20f is implemented differently from the preceding exemplary embodiments. The support beam 20f is embodied in a multi-part implementation. The support beam 20f comprises two outer elements 58f, 60f. The outer elements 58f, 60f are arranged spaced apart from one another. The outer elements 58f, 60f are implemented as plates. The outer elements 58f, 60f implemented as plates are herein in particular implemented as plates made of a composite material. The outer elements 58f, 60f are made of a composite material. The outer elements 58f, 60f are in particular made of a thermoplastic composite material. Herein the outer elements 58f, 60f are preferably embodied of carbon-fiber-reinforced plates which are made of a thermoplastic matrix. The outer elements 58f, 60f are embodied as pre-preg plates. The support beam 20f comprises two connection elements 62f, 64f. The outer elements 58f, 60f are connected to one another via two connection elements 62f, 64f. The connection elements 62f, 64f and the outer elements 58f, 60f are implemented of different materials. The outer elements 58f, 60f are implemented of a more rigid material than the connection elements 62f, 64f. The connection elements 62f, 64f are implemented of a metal sheet. In particular the connection elements 62f, 64f are implemented of a titanium sheet, an aluminum sheet and/or of a magnesium sheet. The connection elements 62f, 64f herein have a U-shaped cross section. The connection elements 62f, 64f are oriented outwards with their open side. The connection elements 62f, 64f respectively face each other with their closed undersides. The connection elements 62f, 64f are aligned in such a way that they are spaced apart from each other. The outer side surfaces of the connection elements 62f, 64f respectively face towards one of the outer elements 58f, 60f. Via the side surfaces the connection elements 62f, 64f are connected to the outer elements 58f, 60f. Herein the connection elements 62f, 64f and the outer elements 58f, 60f are preferentially connected by substance-to-substance bond. The connection elements 62f, 64f and the outer elements 58f, 60f are preferably connected to one another via adhesive bonding. Principally it is also conceivable that the connection elements 62f, 64f and the outer elements 58f, 60f are connected to one another by another method that is deemed expedient by someone skilled in the art, e.g. by a form-fit and/or force-fit connection. Due to being spaced apart, the connection elements 62f, 64f and the outer elements 58f, 60f together enclose an inner region of the support beam 20f. As a result of this, the support beam 20f is embodied as a double-I-beam.

The support beam 20f is implemented as a simple hollow profile. The support beam 20f herein comprises only one wall, which delimits a single hollow space inside. The support beam 20f has a changing wall thickness 26f in a circumferential direction 24f of the support beam 20f. The wall thickness 26f is herein measured along an inner contour 30f of the support beam 20f towards an outside.

As can be seen in FIG. 9, the support beam 20f comprises two linking elements 66f, 68f. The first linking element 66f is herein configured for a connection of a seat divider. Principally it is also conceivable that the first linking element 66f is configured for a connection of other elements of the aircraft seat. The linking element 66f is attached to an upper side of the support beam 20f. The linking element 66f herein engages on one side around the upper outer element 58f and a portion of the connection element 64f. Furthermore the linking element 66f is connected to the outer element 58f via substance-to-substance bond, in particular a glue connection. The linking element 66f comprises an accommodation hole 70f. Via the accommodation hole 70f the seat divider is connected to the linking element 66f and thus to the support beam 20f. The second linking element 68f is configured for a connection of a seat module (not shown), like for example a footrest, a leg rest or a video arm. For this purpose the linking element 68f is arranged inside the U shape of the connection element 62f. Herein the linking element 68f is connected to the connection element 62f via substance-to-substance bond. The linking element 68f comprises an accommodation hole 72f. Via the accommodation hole 72f, a seat foot is connectable to the linking element 68f and thus to the support beam 20f.

FIG. 10 shows an aircraft seat device in an exemplary embodiment that is not part of the invention. The aircraft seat device is part of an aircraft seat that is not shown in detail. The aircraft seat comprises a mounting unit 12g, via which it is mounted in the aircraft cabin. The mounting unit 12g comprises two support beams 20g. As a difference to the preceding exemplary embodiments, the support beam 20g is implemented in a different manner. The support beam 20g is embodied in a multi-part implementation. The support beam 20g comprises two outer elements 58g, 60g. The outer elements 58g, 60g are arranged spaced apart from one another. The outer elements 58g, 60g are connected to one another by two connection elements 62g, 64g. The support beam 20g comprises the two connection elements 62g, 64g. The connection elements 62g, 64g and the outer elements 58g, 60g are implemented of different materials. In contrast to the connection elements of the preceding sixth exemplary embodiment, the connection elements 62g, 64g are embodied differently. The connection elements 62g, 64g are also embodied substantially U-shaped. In addition, the connection elements 62g, 64g each have form-fit elements 74g, 76g, 78g, 80g on their ends, via which the connection elements 62g, 64g are coupled with the outer elements 58g, 60g in a form-fit manner. The connection elements 62g, 64g engage around the outer elements 58g, 60g with the form-fit elements 74g, 76g, 78g, 80g.

FIG. 11 shows an aircraft seat device in an exemplary embodiment that is not part of the invention. The aircraft seat device is part of an aircraft seat, which is not shown in detail. The aircraft seat comprises a mounting unit 12h, via which it is mounted in the aircraft cabin. The mounting unit 12h comprises two support beams 20h. As a difference to the preceding exemplary embodiments, the support beam 20h is implemented in a different manner. The support beam 20h is embodied in a multi-part implementation. The support beam 20h comprises two outer elements 58h, 60h. The outer elements 58h, 60h are arranged spaced apart from one another. The outer elements 58h, 60h are connected to one another by two connection elements 62h, 64h. The support beam 20h comprises the two connection elements 62h, 64h. The connection elements 62h, 64h and the outer elements 58h, 60h are implemented of different materials. In contrast to the connection elements of the preceding sixth exemplary embodiment, the connection elements 62h, 64h are embodied differently. The connection elements 62h, 64h respectively have form-fit elements 74h, 76h, 78h, 80h on their upper and lower ends. Herein the two form-fit elements 74h, 76h, 78h, 80h of a connection element 62h, 64h differ from each other. A form-fit element 74h, 78h of the connection elements 62h, 64h is herein implemented hook-shaped and is configured to respectively engage around one end of one of the outer elements 58h, 60h. The form-fit elements 74h, 78h are implemented U-shaped. The form-fit elements 76h, 80h are implemented L-shaped and are configured to provide a support surface for an end of one of the connection elements 62h, 64h. The connection elements 62h, 64h are respectively connected to the form-fit elements 74h, 76h, 78h, 80h by substance-to-substance bond.

FIG. 12 shows an aircraft seat device in a ninth exemplary embodiment. The aircraft seat device is part of an aircraft seat, which is not shown in detail. The aircraft seat comprises a mounting unit 12i, via which it is mounted in the aircraft cabin. The mounting unit 12i comprises a support beam 20i and a support beam that is not shown. As a difference from the first exemplary embodiment, merely the cross section of the support beam 20i and of the support beam that is not shown differs from the corresponding support beams of the first exemplary embodiment. The support beam 20i and the support beam that is not shown are implemented identically, and therefore only the support beam 20i will be described in detail in the following. For an explanation of the support beam that is not shown, the following description of the support beam 20i may be applied.

The support beam 20i is embodied as a simple hollow profile. The support beam 20i herein comprises only one wall, which delimits a single hollow space inside. The support beam 20i has a changing wall thickness 26i in a circumferential direction 24i of the support beam 20i. The wall thickness 26i is herein realized by a distance between an inner contour 30i and an outer contour 28i of the support beam 20i, viewed from a center point of the support beam 20i radially outward. The support beam 20i has a circle-shaped outer contour 28i. The basic shape of the outer contour 28i herein forms a circle. The outer contour 28i is implemented analogously to the corresponding outer contour of the support beam of the first exemplary embodiment.

An inner contour 30i of the support beam 20i has a basic shape that differs from the basic shape of the outer contour 28i. The inner contour 30i of the support beam 20i is embodied partially elliptically. By way of the partially elliptical implementation of the inner contour 30i of the support beam 20i, the wall thickness 26i of the support beam 20i changing in the circumferential direction 24i is easily achievable. By way of the partially elliptical implementation of the inner contour 30i, the support beam 20i has in one radial direction a substantially smaller wall thickness than in a radial direction that is rotated by 90 degrees. On two opposite sides the inner contour 30i realizes two planar inner faces 82i, 84i, which extend in parallel to each other. By the planar inner faces 82i, 84i, the wall thickness 26i is substantially increased in the regions of the planar inner faces 82i, 84i. In this way it is possible to implement a particularly stable support beam 20i. By the planar inner faces 82i, 84i in particular errors occurring during an extrusion procedure are avoidable, as a result of which in particular a production of the support beam 20i is optimizable. This in particular allows achieving a cost-efficient production of the support beam 20i.

The invention claimed is:

1. An aircraft seat device with at least one support beam, which is configured to realize at least part of a mounting unit of an aircraft seat, wherein
   the at least one support beam is hollow and is configured by a single wall that encompasses an interior space,
   in at least one partial region, viewed in a cross-sectional plane of the support beam, the wall has a changing wall thickness in a circumferential direction of the support beam and an at least substantially circular outer contour, and
   a basic shape of an inner contour of the support beam differs at least in partial regions from a basic shape of the outer contour.

2. The aircraft seat device according to claim 1, wherein the support beam is a one-piece element.

3. The aircraft seat device according to claim 1, wherein the support beam has a changing wall thickness along its longitudinal extension.

4. The aircraft seat device according to claim 1, wherein the support beam has at least one symmetry axis.

5. The aircraft seat device according to claim 1, wherein the support beam is at least partially implemented of a rolled metal sheet.

6. An aircraft seat with an aircraft seat device according to claim 1.

7. The aircraft seat device according to claim 1, wherein the basic shape of the inner contour is elliptical.

8. The aircraft seat device according to claim 1, wherein the inner contour includes a plurality of elevations, which extend radially inward.

9. The aircraft seat device according to claim 1, wherein the basic shape of the outer contour is a circle and the basic shape of the inner contour is non-circular.

* * * * *